US012744041B2

(12) United States Patent
Cronin et al.

(10) Patent No.: US 12,744,041 B2
(45) Date of Patent: Sep. 22, 2026

(54) DYNAMIC ASSISTANT SUGGESTIONS DURING ASSISTANT BROWSING

(71) Applicant: GOOGLE LLC, Mountain View, CA (US)

(72) Inventors: Stacy Cronin, Berkeley, CA (US); Cliff Kuang, San Francisco, CA (US); Abraham Wallin, San Francisco, CA (US); Katrina Egert-Pecot, Sunnyvale, CA (US); Sean Joseph Klassen, Burlington, VT (US); Caleb Misclevitz, Portland, OR (US); Karan Patel, New York, NY (US); Ian Baker, San Francisco, CA (US); Simon Sok, Brooklyn, NY (US); Ryan Allen, Denver, CO (US)

(73) Assignee: GOOGLE LLC, Mountain View, CA (US)

( * ) Notice: Subject to any disclaimer, the term of this patent is extended or adjusted under 35 U.S.C. 154(b) by 77 days.

(21) Appl. No.: 18/891,636

(22) Filed: Sep. 20, 2024

(65) Prior Publication Data

US 2025/0014580 A1 Jan. 9, 2025

Related U.S. Application Data

(63) Continuation of application No. 17/538,736, filed on Nov. 30, 2021, now Pat. No. 12,100,395.

(51) Int. Cl.
*G06F 3/048* (2013.01)
*G06F 3/0482* (2013.01)
(Continued)

(52) U.S. Cl.
CPC ............ *G10L 15/22* (2013.01); *G06F 3/0482* (2013.01); *G06F 3/167* (2013.01); *G10L 15/18* (2013.01);
(Continued)

(58) Field of Classification Search
CPC ... G10L 15/22; G10L 15/18; G10L 2015/223; G10L 2015/228; G10L 15/24;
(Continued)

(56) References Cited

U.S. PATENT DOCUMENTS 5,664,061 A 9/1997 Andreshak
6,654,721 B2 11/2003 Handelman
(Continued)

FOREIGN PATENT DOCUMENTS

CN 112204500 1/2021
CN 113421151 9/2021
(Continued)

OTHER PUBLICATIONS

China Intellectual Property Office, Notice of Grant issued in Application No. 202280026429.0, 4 pages, dated Apr. 9, 2026.
(Continued)

*Primary Examiner* — Abul K Azad
(74) *Attorney, Agent, or Firm* — Gray Ice Higdon

(57) ABSTRACT

Some implementations relate to an automated assistant that can provide assistant suggestions based on content that the user has requested for the automated assistant to render at a computing device. In some instances, an assistant suggestion can correspond to a portion of the content that is not being rendered at the computing device but that is part of the content that the user is accessing. In other instances, an assistant suggestion can be based on data that can indicate how one or more users may have interacted with their automated assistant when viewing the content. Therefore, an assistant suggestion can correspond to an assistant operation that may have been initialized by another user who had previously viewed the content. In some implementations, an
(Continued)

arrangement of the assistant suggestions can be modified according to which part of the content a user is viewing and/or user distance.

20 Claims, 8 Drawing Sheets

(51) Int. Cl.
*G06F 3/16* (2006.01)
*G10L 15/18* (2013.01)
*G10L 15/22* (2006.01)

(52) U.S. Cl.
CPC .. *G10L 2015/223* (2013.01); *G10L 2015/228* (2013.01)

(58) Field of Classification Search
CPC ....... G10L 15/25; G06F 3/0482; G06F 3/167; G06F 16/345; G06F 16/90324; G06F 16/90332; G06F 16/904; G06F 16/9577
See application file for complete search history.

(56) References Cited

U.S. PATENT DOCUMENTS

| | | | | |
|---|---|---|---|---|
| 9,378,740 | B1 | 6/2016 | Rosen et al. | |
| 11,114,100 | B2 | 9/2021 | Vuskovic et al. | |
| 11,238,864 | B2 | 2/2022 | Fink et al. | |
| 12,100,395 | B2 * | 9/2024 | Cronin | G06F 16/345 |
| 2008/0148179 | A1 * | 6/2008 | Sloo | H04N 21/4314 715/792 |
| 2009/0007017 | A1 * | 1/2009 | Anzures | G06F 3/04883 715/835 |
| 2011/0252375 | A1 * | 10/2011 | Chaudhri | H04N 7/147 715/835 |
| 2015/0254057 | A1 | 9/2015 | Klein et al. | |
| 2015/0382047 | A1 | 12/2015 | Van Os et al. | |
| 2019/0341027 | A1 * | 11/2019 | Vescovi | G10L 15/22 |
| 2020/0167597 | A1 | 5/2020 | Nguyen et al. | |
| 2023/0169967 | A1 | 6/2023 | Cronin et al. | |

FOREIGN PATENT DOCUMENTS

| | | |
|---|---|---|
| WO | 2019217178 | 11/2019 |
| WO | 2020139408 | 7/2020 |

OTHER PUBLICATIONS

Ricker, T. "Google explains how Nest Hubs know to display what's important"; The Verge; retrieved from the internet: URL:http://web.archive.org/web/20201111222857; https://www.theverge.com/2019/12/5/20996723/nest-hub-ultrasonic-proximity-sensor-explainer; 19 pages; dated Nov. 11, 2020.

Bohn, D. "Google's Project Soil: the tech behind Pixel 4's Motion Sense radar"; retrieved from the internet: URL: http://web.archive.org/web/20201111203707/https://www.theverge.com/2019/10/15/20908083/google-pixel-4-project-soil-radar-motion-sense-explainer; 9 pages; dated Nov. 11, 2020.

European Patent Office; International Search Report and Written Opinion issued in Application No. PCT/US2022/042790; 15 pages; dated Dec. 12, 2022.

European Patent Office; Communication pursuant to Article 94(3) EPC issued in Application No. 22789728.7; 8 pages; dated Dec. 17, 2024.

Pundak, G. et al.; Deep Context: End-to-end Contextual Speech Recognition; IEEE (SLT); 8 pages; dated Dec. 18, 2018.

China Intellectual Property Office, First Office Action issued in Application No. 202280026429.0, 28 pages, dated Nov. 21, 2025.

European Patent Office; Summons issued in Application No. 22789728.7; 11 pages; dated May 29, 2026.

* cited by examiner

COMPUTING DEVICE
302

ASSISTANT INTERFACE
320

APPLICATIONS
334

APPLICATION DATA
330

DEVICE DATA
332

CONTEXTUAL DATA
336

AUTOMATED ASSISTANT
304

INPUT PROCESSING ENGINE
306

SPEECH PROCESSING ENGINE
308

DATA PARSING ENGINE
310

PARAMETER ENGINE
312

OUTPUT GENERATING ENGINE
314

ASSISTANT DATA
328

PRIOR INTERACTION ENGINE
324

ASSISTANT SUGGESTION ENGINE
316

ELEMENT ARRANGEMENT ENGINE
326

ENTRY POINT ENGINE
318

DYNAMIC ASSISTANT SUGGESTIONS DURING ASSISTANT BROWSING

BACKGROUND

Humans can engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed, and/or by providing textual (e.g., typed) natural language input.

Although some automated assistants can allow a user to access webpage data, many webpages are programmed for desktop computers and portable devices, such as cellular phones and tablet devices. As a result, although an automated assistant may be able to cause a website to be opened at a particular device, further user interactions with the website may not be possible via the automated assistant, may be limited to interactions via certain input modalities, and/or may be limited to certain restricted interactions via input modalities. For example, should the user desire to engage with a graphical rendering of the website, the user may have to use a cursor, keyboard, and/or touch interface—and may be unable to interact with the rendering via voice and/or may only be limited to certain voice interaction(s) (e.g., limited to "scroll up" and "scroll down"). This can result in inefficient interactions with the website, inability to perform certain interactions with the website, and/or other drawback(s), each of which can result in excess usage of computational resources of the particular device.

As one example, when a user invokes an automated assistant via a standalone display device to access a website, the automated assistant can be unable to render the website fully (or at all) and, as a result, suggest that the user access the website through their cellular phone. Therefore, power and processing bandwidth at multiple devices would be consumed as a result of the automated assistant being unable to facilitate interactions with the website at the standalone display device. In some instances, this lack of versatility for certain websites can be due to limitations in style sheets and/or other specifications stored in association with the websites. A website that is designed for mobile browsers and desktop browsers may not be suitable for an automated assistant to access beyond retrieving snippets of data from the website. Should a user desire to browse the website further, or view other related websites, the user may necessarily need to access a separate application that has the functionality of a web browser—even though the separate application may not simultaneously provide one or more beneficial utilities of the automated assistant.

SUMMARY

Some implementations set forth herein relate to an automated assistant that can be invoked to visually render content at a display interface and to simultaneously render (e.g., visually) assistant suggestions that can optionally be dynamically updated by the automated assistant as the user interacts with the content. In some implementations, the assistant suggestions that are simultaneously rendered with certain content can be based on a variety of different data associated with the user, data associated with the automated assistant, and/or data associated with the content itself.

As one example of some of those implementations, a user can invoke an automated assistant in order to view a recipe. The user can invoke the automated assistant by providing a spoken utterance such as, "Assistant, show me a recipe for chow mein" after ordering grocery items using their automated assistant. In response, the automated assistant can access webpage data from a recipe webpage and cause the webpage data to be rendered at a display interface of a computing device. Optionally, and as described herein, the automated assistant can initially, in response to the spoken utterance, cause a search for "recipe for chow mein" to be performed, identify multiple resources that are responsive to the search (including the recipe webpage), and present a corresponding search result for each of the resources (e.g., each search result can include snippet(s) of content from a corresponding resource). The user can then select (e.g., via tapping or via a voice selection) the search result corresponding to the recipe webpage, which can cause the webpage data to be rendered. When the webpage data is rendered, the user can scroll through the content rendered at the display interface by providing another input to the automated assistant, such as a touch input and/or another spoken utterance (e.g., "Scroll down."). The automated assistant can cause assistant suggestions to be displayed with the rendered content (e.g., in a separate pane to the left or to the right of a pane rendering the webpage content), and the subject matter of one or more of the assistant suggestions, that are displayed at a given time, can be selected by the automated assistant based on a portion of the rendered content that is currently visible to the user at the given time.

For example, as the automated assistant is scrolling through the webpage (e.g., a chow mein recipe) in response to user input (or even automatically), the display interface can eventually render a portion of the webpage data that provides a list of ingredients for a recipe. Because the user had previously queried the automated assistant to order grocery items just before accessing the webpage, the automated assistant can prioritize any suggestions associated with ordering food items lower than other suggestions. Accordingly, when the list of ingredients is being rendered, the assistant suggestions can lack any food ordering suggestion(s) and can instead include navigational suggestion(s), such as navigational suggestion(s) that can each be selected or spoken to cause a corresponding portion of the webpage to be navigated to and displayed. Continuing with the example, when the automated assistant scrolls to a portion of the webpage that details oven pre-heating instructions, the automated assistant, in response, can cause an assistant suggestion to be rendered for controlling a smart oven (whereas that suggestion was not displayed previously). When the smart oven assistant suggestion is selected based on user input, the automated assistant can cause a smart oven in the home of the user to be pre-heated to a temperature that is specified in the webpage. Alternatively, if the assistant suggestion is not selected and the automated assistant continues to scroll through the webpage, the assistant suggestion can be replaced by a different assistant suggestion (e.g., for setting a cooking timer based on the recipe instructions) that is based on other data in the webpage data and/or other data.

In some implementations, multiple assistant suggestions can be rendered adjacent to content (e.g., webpage data and/or other application data) for providing a listing of unique suggestions generated based on the content. For instance, each assistant suggestion can include natural language content that summarizes a portion of the content and, when a user selects an assistant suggestion (e.g., through a touch input or a spoken input that matches the assistant suggestion), the automated assistant can scroll to the corresponding portion of the content. For example, in accordance with the aforementioned example, a rendered assistant suggestion can include a navigational suggestion that includes content summarizing a portion of the recipe (e.g., the navigational suggestion can be "Serving Instructions"). In response to a user selecting this rendered assistant suggestion, the automated assistant can scroll to a portion of the recipe that is provided under the heading "Tips for Beautifully Plating This Masterpiece," and the automated assistant can also cause the rendered assistant suggestion to be replaced. For instance, a replacement assistant suggestion can refer to an assistant action that may be helpful for the portion of the recipe that is visible. The assistant action can be, but is not limited to, a text-to-speech action for reading the "tips for serving" to the user, a scrolling action for further scrolling through the content, playing a video that may be included in the recipe page, and/or an action that causes the automated assistant to "pivot" to another page (e.g., a different recipe article that is based on other webpage data and/or other application data).

Continuing with the example, of the preceding paragraph, it is noted that the navigational suggestion of "Serving Instructions" differs from the "Tips for Beautifully Plating This Masterpiece" heading of the webpage, to which the automated assistant navigates when that navigational suggestion is selected. For example, the navigational suggestion does not include any terms in common with the heading, and is more concise (i.e., fewer characters) than the heading—yet is still semantically aligned with the heading and the content that immediately follows the heading. In some implementations, the navigational suggestion is generated to be more concise (i.e., fewer characters) to enable selection of the navigational suggestion with a more concise spoken utterance, which results in reduction of computational resources utilized in performing speech recognition of the spoken utterance and also results in shortening the duration of the user's interaction with the webpage. In some implementations, the navigational suggestion is generated to be more concise (i.e., fewer characters) to enable the navigational suggestion to be rendered within the display constraints of the display of the assistant device. For example, the assistant suggestions portion of the display interface can be limited to a small portion (e.g., 25% or less, 20% or less) of available display, to ensure efficient viewing of the webpage in the content viewing portion of the interface, and the navigational suggestion generated with a maximum character limit to ensure it can be rendered within those constraints.

Various techniques can be utilized to generate navigational suggestions that are more concise, while also ensuring the navigational suggestions are semantically aligned with the portion of the content to which they are linked. As one example, a navigational suggestion can be generated using a text summarization technique (e.g., using a trained text summarization machine learning model) with maximum character constraints. For instance, the heading can be processed, using the text summarization technique, to generate summarized text that is utilized as the navigational suggestion. As another example, the navigational suggestion can be generated based on anchor text for anchor link(s) to the portion of the content (i.e., hyperlinks that navigate to a portion of a resource specifically (e.g., a specific XML or HTML tag) vs. the resource overall) jump hyperlinks. For instance, certain anchor text can be selected based on it satisfying maximum character constraints and, optionally, based on it being the most frequently occurring anchor text amongst those that satisfy the maximum character constraints. Optionally, if no anchor text satisfies the character constraints, a navigational suggestion can be generated based on applying a text summarization technique to an anchor text (e.g., the most frequently occurring anchor text), and using the summarized text as the navigational suggestion. As yet another example, the navigational suggestion can be generated based on generating an embedding of the portion of content (e.g., by processing text thereof using Word2Vec, BERT, or other trained model), and determining a word or phrase that satisfies character constraints and has an alternate embedding, in the embedding space, that is "close" the generated embedding. For instance, the "Tips for Beautifully Plating This Masterpiece" heading and text that immediately follows the heading can be processed to generate a first word embedding. Further, "Serving Instructions" can be selected as a navigational suggestion for that heading based on determining it satisfies character limits and determining it has a second embedding that is closest, in the embedding space and amongst candidate navigational suggestions satisfying character limits, to the first embedding.

In some implementations, an assistant suggestion that is rendered adjacent to other content can be based on historical interactions between the user and the automated assistant, and/or other users and their automated assistants, when accessing similar content. For example, a user that provides a spoken utterance such as, "Assistant, how is hail formed?" can cause the automated assistant to render webpage data detailing how hail is produced in the atmosphere. When the user is viewing a particular portion of the webpage data that details potential damage that can be caused by hail, the automated assistant can generate supplemental content that is based on that particular portion of the webpage data. For example, the automated assistant can generate the supplemental content based on previous instances when the user or another user viewed the portion of the webpage data and caused the automated assistant to perform a particular action.

For instance, historical interaction data can indicate that other users who had viewed content associated with hail damage had also used their automated assistant to place a phone call to an insurance company. Based on this historical interaction data, and in response to the user viewing the portion of the webpage data, the automated assistant can cause an assistant suggestion to be rendered for placing a phone call to an insurance company. This assistant suggestion can be rendered concurrently to the rendering of the portion of the webpage data and, in response to the user selecting the assistant suggestion, the automated assistant can cause the computing device, or another computing device to call an insurance company. When the user scrolls past the portion of the webpage data associated with hail damage, the automated assistant can cause this assistant suggestion (e.g., "Call my insurance provider") to be replaced with a different assistant suggestion that is based on another portion of the webpage data that is subsequently rendered.

In some implementations, one or more assistant suggestions that are rendered with search result data and/or other application data can correspond to an action for modifying and/or augmenting the search result data and/or other application data. For example, when the user is viewing the "hail damage" portion of the webpage data, the user may select an assistant suggestion that causes other webpage data to be rendered. The other webpage data can correspond to a form for receiving information about hail damage insurance. When the automated assistant determines that the user is viewing an "address" portion of the form, the automated assistant can cause another assistant suggestion to be rendered. The other assistant suggestion can correspond to an action for causing address data of a user to be filled into the form, with prior permission from the user. When the user taps the other assistant suggestion, the automated assistant can cause the address data to be placed into the form and then cause a replacement suggestion to be rendered at the display interface.

In some implementations, search result data can be dynamically adapted according to a distance of a user to a display interface that is rendering the search result data. This can promote time-efficient review of search results based on the distance of the user from the display interface. Furthermore, search result data can be dynamically adapted according to any size restraints of the display interface and/or any other restraints of a device from which a user is accessing an automated assistant. For example, when a user is outside of a threshold distance from a display interface that is rendering search results, the automated assistant can cause a single search result to be rendered at the display interface, such that the search result is visible from the distance of the user. While the user is outside the threshold distance, the automated assistant can receive inputs (e.g., a swipe gesture at a non-zero distance from the display interface, spoken utterance, etc.) from the user for navigating to a different search result. When the user moves within the threshold distance, the automated assistant can cause the display interface to render additional details regarding a search result that is being currently rendered. Alternatively, or additionally, the automated assistant can cause the display interface to render one or more additional search results of the search result data when the user is within the threshold distance, thereby allowing the user to identify a suitable search result more quickly. This can reduce search navigation times and therefore preserve power and other resources that are consumed when a user is continuing to navigate through assistant search results.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
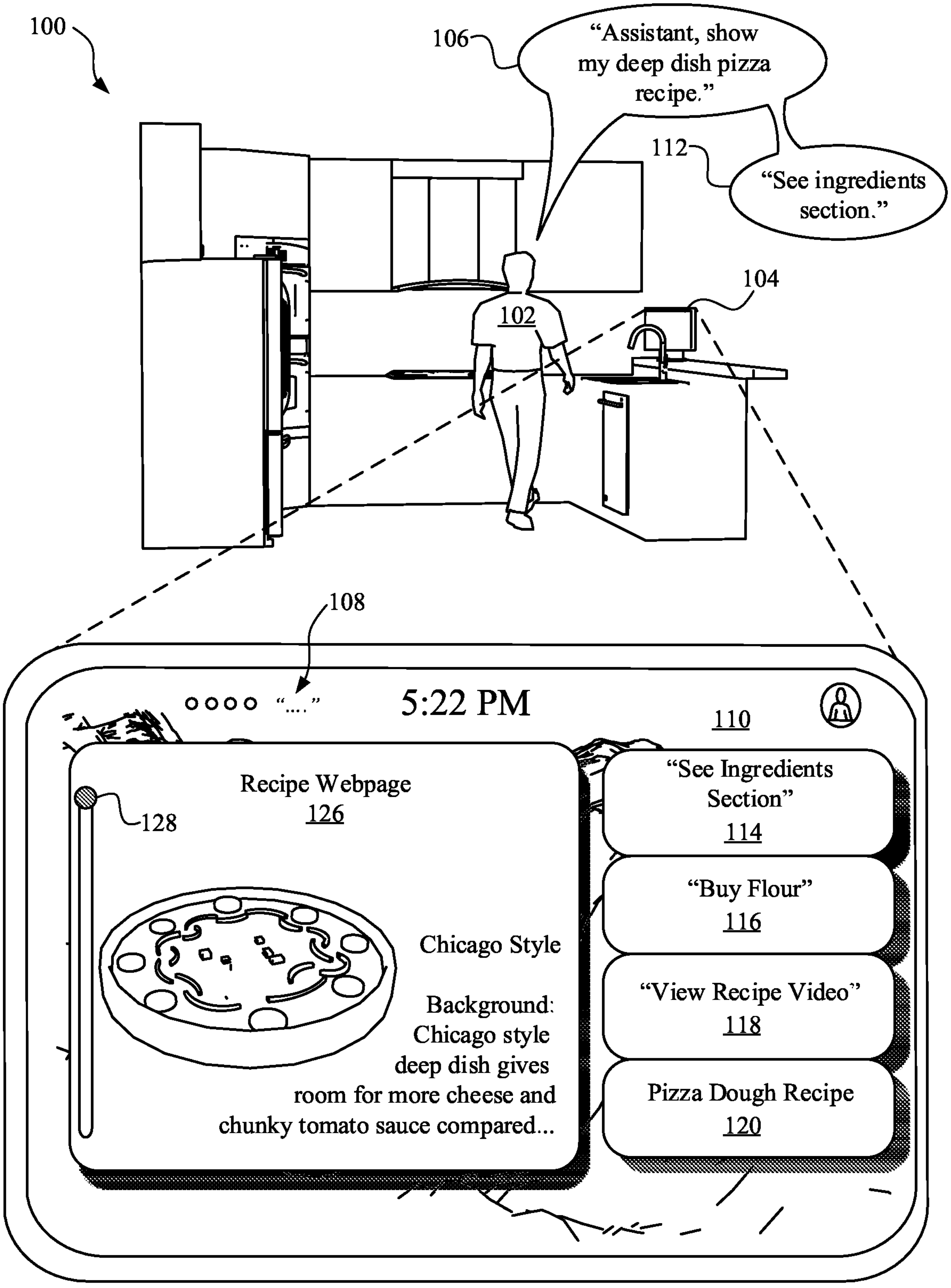
FIG. 1A and FIG. 1B illustrate views of a user interacting with an automated assistant in order to reveal content that can be accompanied by assistant suggestions corresponding to at least a portion of the content.
Figure 1B:
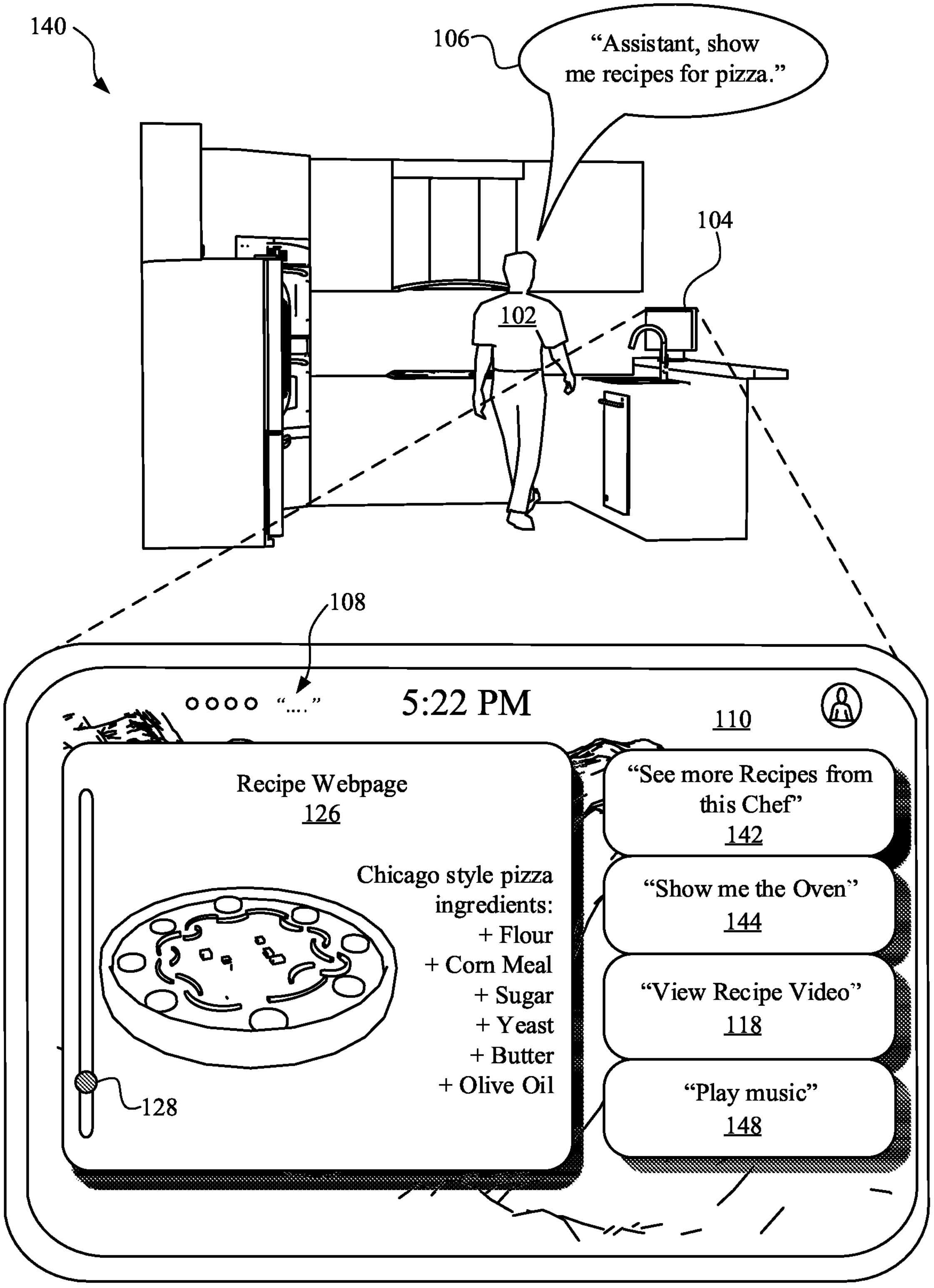

FIG. 1A and FIG. 1B illustrate a view 100 and a view 140 of a user 102 interacting with an automated assistant in order to reveal content that can be accompanied by assistant suggestions corresponding to at least a portion of the content. For example, the user 102 can provide a spoken utterance 106 such as, "Assistant, show my deep dish pizza recipe," which can cause the automated assistant to render a particular recipe website 126 at the computing device 104. Content of a portion of the recipe website 126 rendered at a display interface 110 of the computing device 104 can be processed by the automated assistant. The content can be processed in order to generate one or more assistant suggestions based on the content and/or any other related data.

In some implementations, the automated assistant can process additional content, accessible via the website and/or application, for supplementing the portion of content rendered at the display interface 110. For example, the recipe website 126 can include a background section, an ingredients section, an instructions section, and a media section where the user can watch a video of the recipe being prepared. Based on these additional portions of content, the automated assistant can generate a first assistant suggestion 114 that, when selected, causes the display interface 110 to render the ingredients section of the recipe website 126. In some implementations, the assistant suggestion can be initialized in response to the user 102 providing a spoken utterance, a touch gesture, a motion gesture at a nonzero distance away from the display interface 110, and/or any other input that can be provided to an automated assistant.

In some implementations, the automated assistant can generate one or more assistant suggestions based on historical interaction data and/or contextual data associated with the user 102. For example, the automated assistant can access, with prior permission from the user 102, historical interaction data that indicates the user 102 interacted with an application to order flour multiple months ago. Based on this determination, and the user 102 viewing a website that mentions flour in the ingredients section, the automated assistant can generate a second assistant suggestion 116 that corresponds to an operation for ordering flour. For example, in response to the user 102 selecting the second assistant suggestion 116, the automated assistant can access an application for ordering groceries and select "flour" as an item to be purchased.

Alternatively, or additionally, based on the recipe website 126 having a media section, the automated assistant can generate a third assistant suggestion 118 that corresponds to a "shortcut" to another portion of the content (e.g., the recipe video). In some implementations, the third assistant suggestion 118 can be generated based on historical interaction data that indicates the user or another user has accessed the recipe website 126, with or without their automated assistant, and viewed the recipe video included in the recipe website 126. In this way, the user 102 can be provided with an assistant suggestion that can save them time by not requiring the user 102 to scroll through the entire recipe website 126 to finally see the video. Moreover, the user 102 may be unaware that the recipe video exists, therefore the automated assistant can learn from past interactions with other users, with prior permission from the other users, in order to streamline interactions between the user 102 and their computing device 104.

In some implementations, the automated assistant can generate other assistant suggestions based on the content of the display interface 110 and/or one or more prior requests from the user 102. For example, based on the user 102 requesting the "deep dish pizza" recipe and viewing the content, the automated assistant can generate a fourth assistant suggestion 120 that corresponds to a different website and/or application. The fourth assistant suggestion 120 can, for instance, correspond to an operation for navigating to another website that provides a recipe for pizza dough, rather than Chicago style pizza.

When the user 102 provides an additional spoken utterance 112 such as, "See ingredients section," the automated assistant can process audio data corresponding to the additional spoken utterance 112. The automated assistant can determine, based on the audio data, that the user 102 is selecting the first assistant suggestion 114. In some implementations, speech processing can be biased according to content that is rendered at the display interface 110 and/or natural language content otherwise associated with the assistant suggestions. In response to receiving the additional spoken utterance, the automated assistant can cause the computing device 104 to render another portion of the recipe website 126, as illustrated in view 140 of FIG. 1B.

For example, the automated assistant can cause an "ingredients" section of the recipe website 126 to be rendered at the display interface 110. This can preserve computational resources and power that might otherwise be consumed if the user 102 was required to scroll to the ingredients section by manually tapping and dragging a scroll element 128. In some implementations, the automated assistant can cause the display interface 110 to render one or more additional assistant suggestions based on the content rendered at the display interface 110. The additional assistant suggestions can be based on updated historical interaction data, which can indicate, for example, that the user 102 had previously viewed the "background" section of the recipe website 126. Based on this updated historical interaction data, the automated assistant can omit an assistant suggestion corresponding to the "background" section. Additionally, or alternatively, the automated assistant can determine, based on the updated historical interaction data, that the user 102 has not viewed the recipe video of the recipe website 126. Based on this determination, the automated assistant can cause the display interface 110 to continue rendering the third assistant suggestion 118, even though the user is now viewing a different portion of the recipe website 126.

Alternatively, or additionally, the automated assistant can determine that the user 102 had interacted with a smart oven within a threshold amount of time of viewing the recipe website 126. Based on this determination, the automated assistant can cause the display interface 110 to render an assistant suggestion 144 for accessing a status of the smart oven. The assistant suggestion 144 can be selected by the user 102 using a spoken utterance such as, "Show me the oven," which can cause an application associated with the smart oven to be initialized. In some implementations, the assistant suggestions that are rendered subsequent to the user 102 navigating through webpage data and/or application data can be based on how other users interacted with the automated assistant while viewing the webpage data and/or application data. For example, one or more users who viewed the recipe website 126 may have invoked their automated assistant to play music while they were preparing the recipe. Based on this information, the automated assistant can render an assistant suggestion 148 for playing music while the user 102 is viewing the "ingredients" portion of the recipe website 126. Alternatively, or additionally, one or more other users who viewed the recipe website 126 may have invoked their automated assistant to view other similar recipes, such as those recipes prepared by the same chef as the chef who authored the recipe website 126. Based on this determination, the automated assistant can cause the display interface 110 to render an assistant suggestion 142 for directing the user to other recipes from the chef (e.g., "See more recipes from this chef.").

In some implementations, the assistant suggestions that are rendered at the display interface 110 in FIG. 1A and the other assistant suggestions that are rendered at the display interface 110 at FIG. 1B can be modified as the automated assistant is reading content to the user 102. For example, when the user 102 has requested that the automated assistant read the website content and/or application content to the user 102, the automated assistant can cause the content to scroll along the display interface 110 as the automated assistant dictates the content. As the content is scrolling along the display interface 110, the automated assistant can cause assistant suggestions to be dynamically rendered at the display interface 110. One or more assistant suggestions that are rendered at the display interface 110 can be generated based on a portion of content that is currently being rendered at the display interface 110. Therefore, a variety of different assistant suggestions may be rendered at the display interface 110 at multiple different times as the automated assistant audibly dictates the natural language content being rendered at the display interface 110.

Figure 2A:
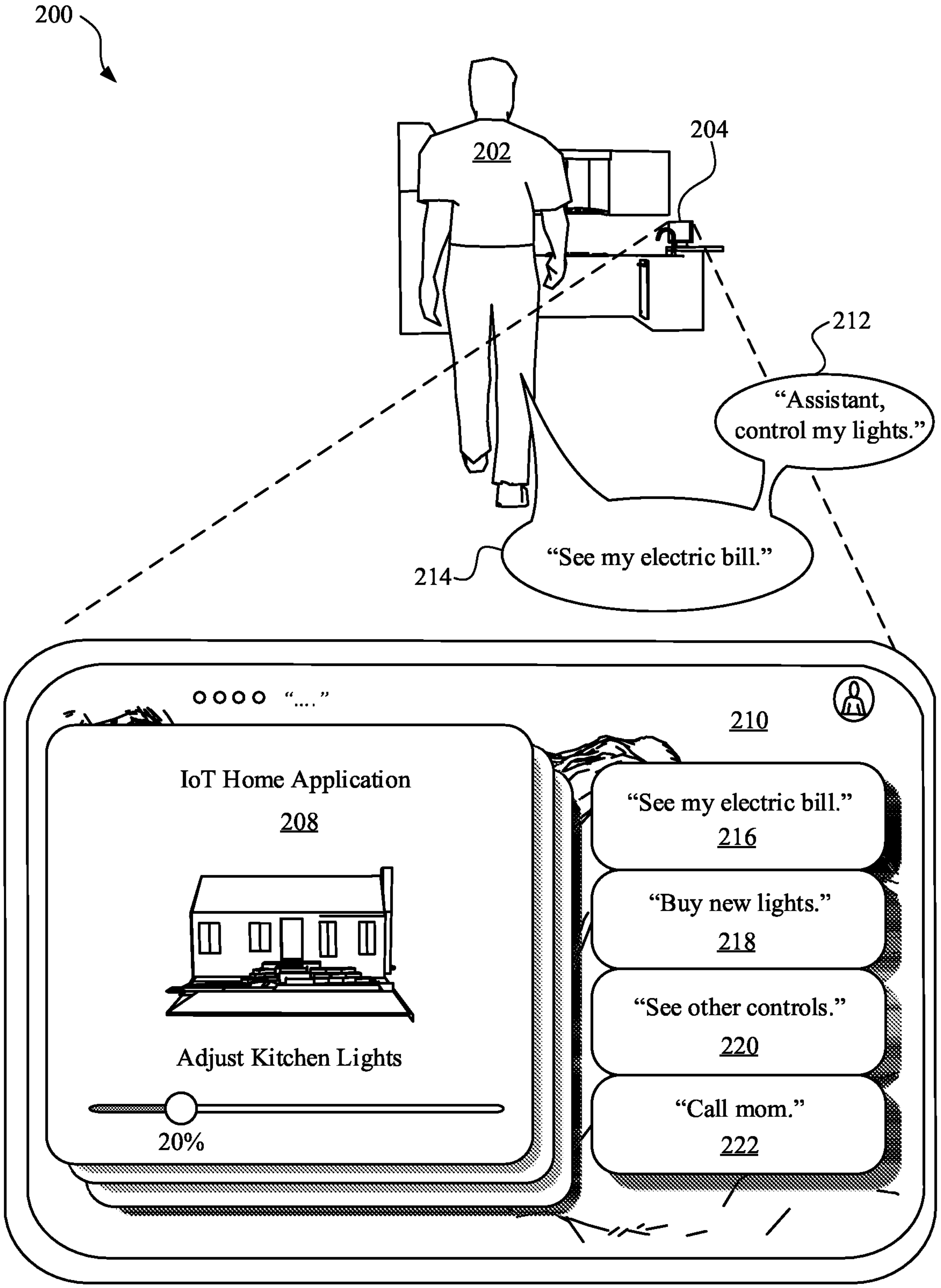
FIG. 2A, FIG. 2B, and FIG. 2C illustrate views of a user interacting with an automated assistant to view content, which can provide a basis for certain assistant suggestions that can be rendered in certain contexts.
Figure 2B:
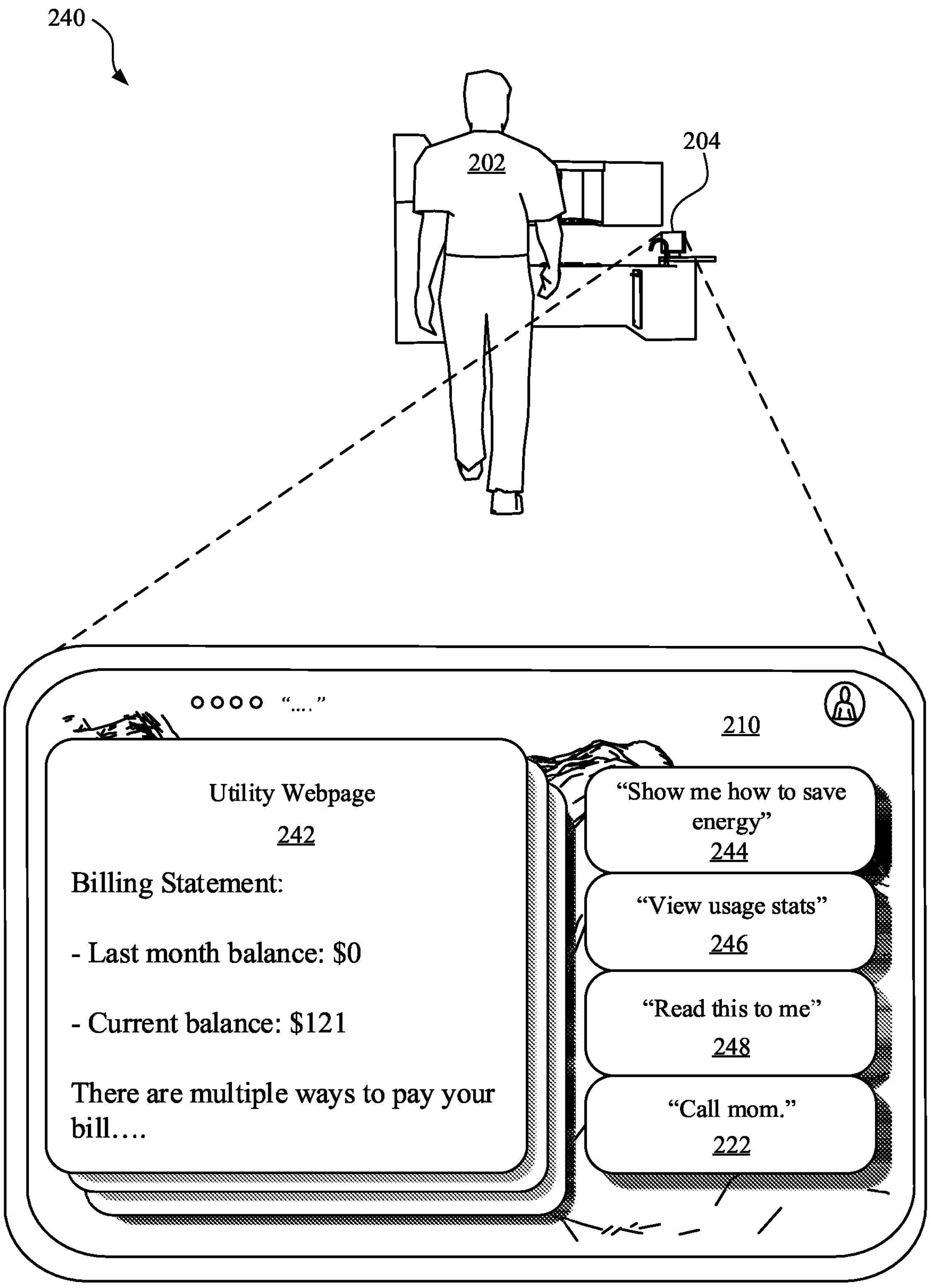
Figure 2C:
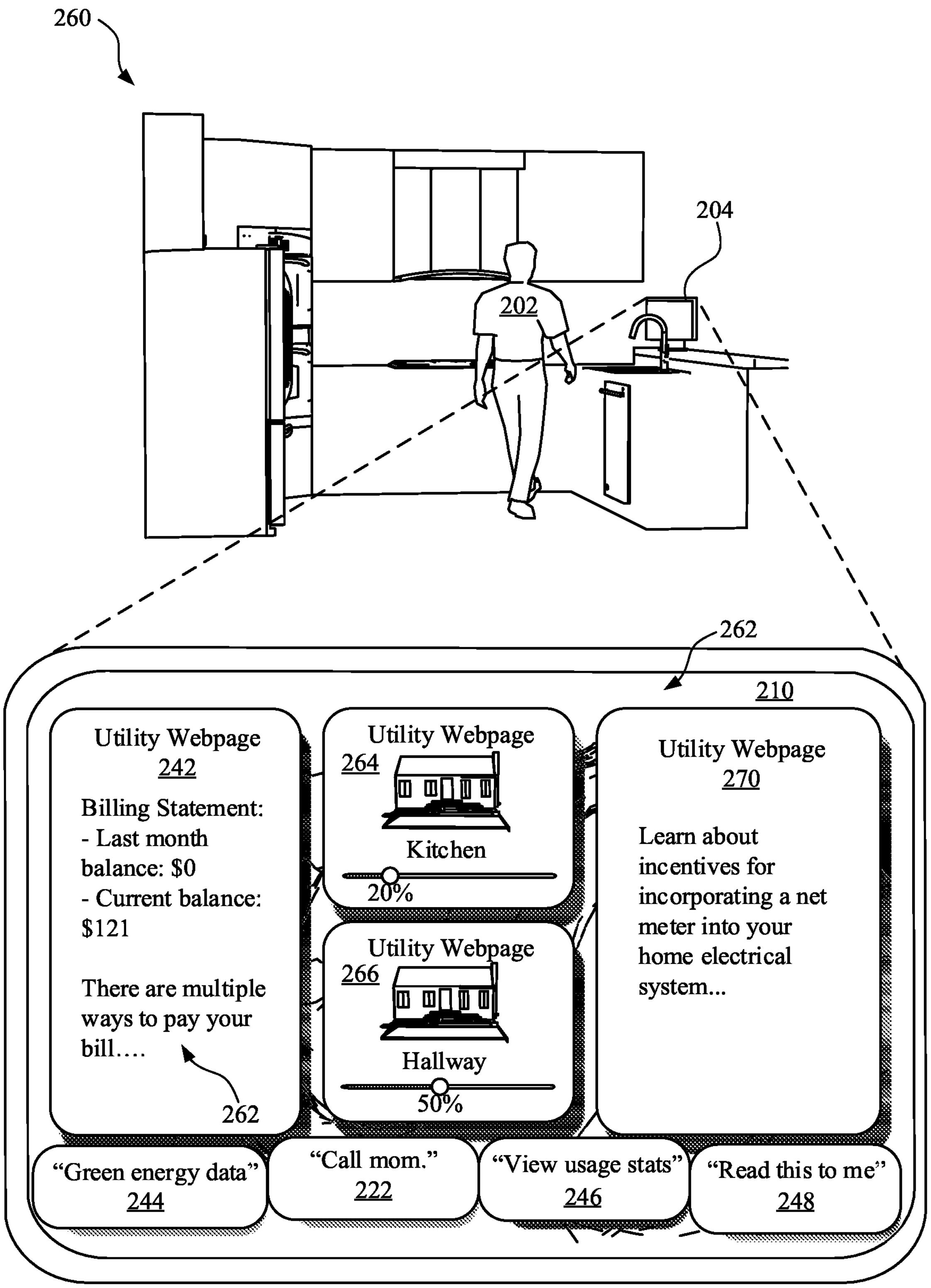

FIG. 2A, FIG. 2B, and FIG. 2C illustrate a view 200, a view 240, and a view 260 of a user 102 interacting with an automated assistant to view content, which can provide a basis for certain assistant suggestions that can be rendered in certain contexts. For example, the user 202 can provide a spoken utterance 212, such as, "Assistant, control my lights," to the automated assistant, which can be accessible via a computing device 204. In response to receiving the spoken utterance 212, the automated assistant can cause a display interface 210 of the computing device 204 to render content based on a request embodied in the spoken utterance 212. For instance, the content can include an internet of things (IoT) Home Application 208, which can allow the user 202 to control the kitchen lights of their home.

Content of the display interface 210 can be processed by the automated assistant and/or another application to generate assistant suggestions that can be rendered simultaneously to an interface of the IoT home application 208 being rendered. The assistant suggestions can include an assistant suggestion 216 for accessing a utility bill of the user 202, an assistant suggestion 218 for purchasing new lights, an assistant suggestion 220 for controlling other devices in the home of the user 202, and/or an assistant suggestion 222 for communicating with a particular content (e.g., "Call mom"). Each of the assistant suggestions can be generated based on content of the display interface 210, content of the spoken utterance 212, historical interaction data, contextual data, and/or any other data that can be accessible to the automated assistant.

The user 202 can select a particular assistant suggestion by providing another spoken utterance 214 such as, "See my electric bill," which can refer to the assistant suggestion 216 for accessing a utility website. In response to receiving the other spoken utterance 214, the automated assistant can cause the display interface 210 to render a utility website 242, which can provide details, with prior permission from the user 202, about the utility usage at a home of the user 202. The automated assistant can process content of the display interface 210 in order to render additional assistant suggestions. In some implementations, the automated assistant can process additional content of the utility website 242 that may not be currently rendered at the display interface 210 in order to generate suggestion data characterizing an assistant suggestion 246 (e.g., "View usage stats"). The assistant suggestion 246 can be a navigational suggestion that embodies content that is more concise than the content to which the assistant suggestion 246 is linked. For instance, the assistant suggestion 246 can link to a portion of the utility website 242 that includes monthly usage data with charts and time tables. This portion of the utility website 242 can be processed by the automated assistant to generate the content "view usage stats," which can be a textual summary and/or concise characterization of the portion of the utility website 242.

Alternatively, or additionally, the automated assistant can identify one or more operations that can be performed for the user 202 to interact with the content at the display interface 210. For instance, the automated assistant can provide an assistant suggestion 248 such as "Read this to me," which, when selected, causes the automated assistant to read natural language content of the utility website 242 to the user 202. Alternatively, or additionally, the automated assistant can provide an assistant suggestion 244 and/or an assistant suggestion 222 that is based on historical interaction data, which can indicate how other users have interacted with an automated assistant when viewing content similar to the utility website 242.

In some implementations, the automated assistant can adapt content of the display interface 210 and/or augment content of the display interface 210, with prior permission from the author of the content, based on how the user 202 is interacting with the content. For example, when the user 202 is located at a first distance outside of a threshold distance from the display interface 210 in FIG. 2B, the automated assistant can render suggestion elements 250 in a stacked arrangement. The stacked arrangement can be an arrangement of suggestion elements that can be modified with a hand gesture that causes a suggestion element (e.g., the utility website 242) to be removed from a foreground of the display interface 210. When the suggestion element in the foreground of the display interface 210 is discarded, another selectable suggestion in the stacked arrangement can be rendered in the foreground of the display interface 210.

When the user 202 relocates to a second distance that is within the threshold distance of the display interface 210, as illustrated in view 260 of FIG. 2C, the automated assistant can cause the assistant suggestions to no longer appear in the stacked arrangement. Rather, in some implementations, the automated assistant can cause the assistant suggestions to appear in a "carousel-like" arrangement and/or coupled arrangement across the display interface 210. When the user is located within the threshold distance, the user 202 can provide an input gesture to the computing device 204 that causes the content elements 262 (i.e., selectable content elements) to simultaneously maneuver across the display interface 210. For example, when a left swipe gesture is performed at the display interface 210, the content element for the utility website 242 can maneuver to the left and/or be at least partially removed from the display interface 210. Simultaneously, and in response to the left swipe gesture, content element 264, content element 266, and/or content element 270 can be rendered further to the left of the display interface 210, while also revealing another content element(s) that was not previously displayed at the display interface 210.

Should the user 202 return to being outside the threshold distance, as detected by the computing device 204 and/or automated assistant, with prior permission from the user 202, the content elements 262 can return to being arranged in the stacked arrangement of FIG. 2B. In this way, when the user 202 is further away from the computing device 204, the display interface 210 can render less suggestion elements than if the user 202 were closer to the computing device 204. Alternatively, or additionally, each content element 262 can be rendered over a larger area (as in FIG. 2B) when the user 202 is further from the computing device 204 compared to when the user 202 is closer to the computing device 204 (as in FIG. 2C).

Figure 3:
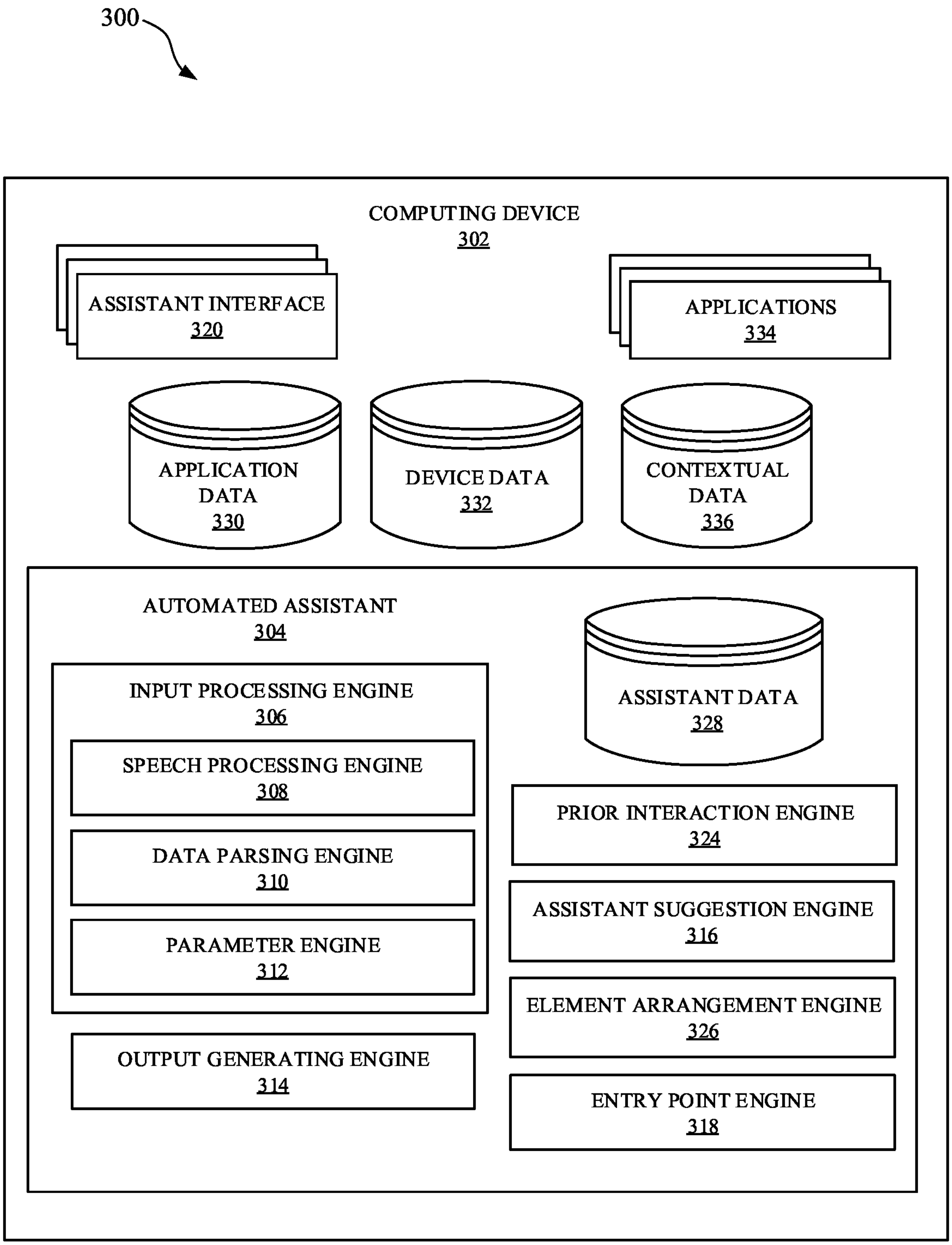
FIG. 3 illustrates a system that provides an automated assistant that can provide assistant suggestions based on content being rendered at a display interface, and adapt the assistant suggestions as the user and/or automated assistant navigates through the content.

FIG. 3 illustrates a system 300 that provides an automated assistant 304 that can provide assistant suggestions based on content being rendered at a display interface, and can adapt the assistant suggestions as the user and/or automated assistant 304 navigates through the content. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.).

Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304.

For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

In some implementations, the system 300 can include a prior interaction engine 324 that can process data associated with prior interactions between one or more users and one or more of their respective automated assistants. The prior interaction engine 324 can process this data in order to identify operations that may have been initialized by the user while the user was viewing certain content at the computing device 302. Thereafter, when the user or another user is viewing this certain content, the prior interaction engine 324 can identify one or more operations that may be relevant to the user or another user.

In some implementations, the system 300 can include an assistant suggestion engine 316, which can process data accessible to the system 300 to generate one or more assistant suggestions to recommend to a user via an assistant interface 320 of the computing device 302. For instance, the prior interaction engine 324 can determine that the user is viewing certain content associated with a prior interaction between the user and the automated assistant 304. Based on this determination, the assistant suggestion engine 316 can generate suggestion data that characterizes one or more selectable suggestions that are based on the prior interaction and the content that the user is currently viewing. For example, during a prior interaction, the user may have viewed recipe ingredients and then added the ingredients to a website checkout page using a grocery application on their phone. When the user subsequently views the recipe ingredients, the prior interaction engine 324 can query the grocery application, with prior permission from the user, in order to determine whether the user purchased the ingredients. Based on this determination, the assistant suggestion engine 316 can generate suggestion data that either suggests that the user finalize their purchase of the ingredients or view another portion of the recipe corresponding to the recipe ingredients (e.g., view ingredient preparation instructions).

In some implementations, the system 300 can include an element arrangement engine 326 that can arrange content elements and/or assistant suggestions based on data that is accessible to the system 300. For example, when a user provides a query to the automated assistant 304 regarding viewing certain content, the automated assistant 304 can identify multiple different instances of content to present to the user. When the user is within a threshold distance of the computing device 302, the element arrangement engine 326 can cause multiple content elements to be arranged in a coupled arrangement across a display interface of the computing device 302. Alternatively, when the user is within the threshold distance of the computing device 302, the element arrangement engine 326 can cause multiple content elements to be arranged in a stacked arrangement. When the content elements are in a stacked arrangement, an area of a foreground content element can be larger than one or more of the content elements that would otherwise be rendered in the coupled arrangement (i.e., a carousel-like arrangement).

In some implementations, the system 300 can include an entry point engine 318 that can determine, with prior permission from the user, how the user arrived at a particular page of content. This determination can be based on data that is accessible to the system 300 and can be used by the assistant suggestion engine 316 and/or element arrangement engine 326 for generating and/or arranging assistant suggestions and/or content elements. For example, the entry point engine 318 can determine that a first user arrived at a recipe page from a link that their friend (e.g., Matthew) sent them via text message. Based on this determination, the assistant suggestion engine 316 can generate an assistant suggestion that corresponds to an operation for sending a text message (e.g., "Send a message to Matthew"). The entry point engine 318 can also determine that a second user arrived at a recipe page from a link in a video. Based on this determination, the assistant suggestion engine 316 can generate an assistant suggestion that corresponds to an operation for returning to view the video and/or for viewing another video that is selected based on content of the recipe page.

In some implementations, the element arrangement engine 326 can modify and/or augment, with prior permission from the content author, content of a content element rendered at the computing device 302. For example, the element arrangement engine 326 can determine, based on data available to the system 300, that content rendered at the computing device 302 can be modified and/or augmented according to information associated with the user. In some instances, an assistant suggestion can be rendered over a portion of content, and/or in place of a portion of content, based on application data 330, device data 332, and/contextual data 336. When, for example, the user is searching for information about a certain food allergy and then accesses a site for viewing a recipe, the element arrangement engine 326 can modify and/or supplement a portion of the content of the recipe to include food allergy information previously viewed by the user. For instance, a portion of the interface referring to "wheat flour" can be supplemented with a content element that refers to "chickpea flour," which the user may have viewed after asking the automated assistant 304 to "show information about wheat allergies."

Figure 4:
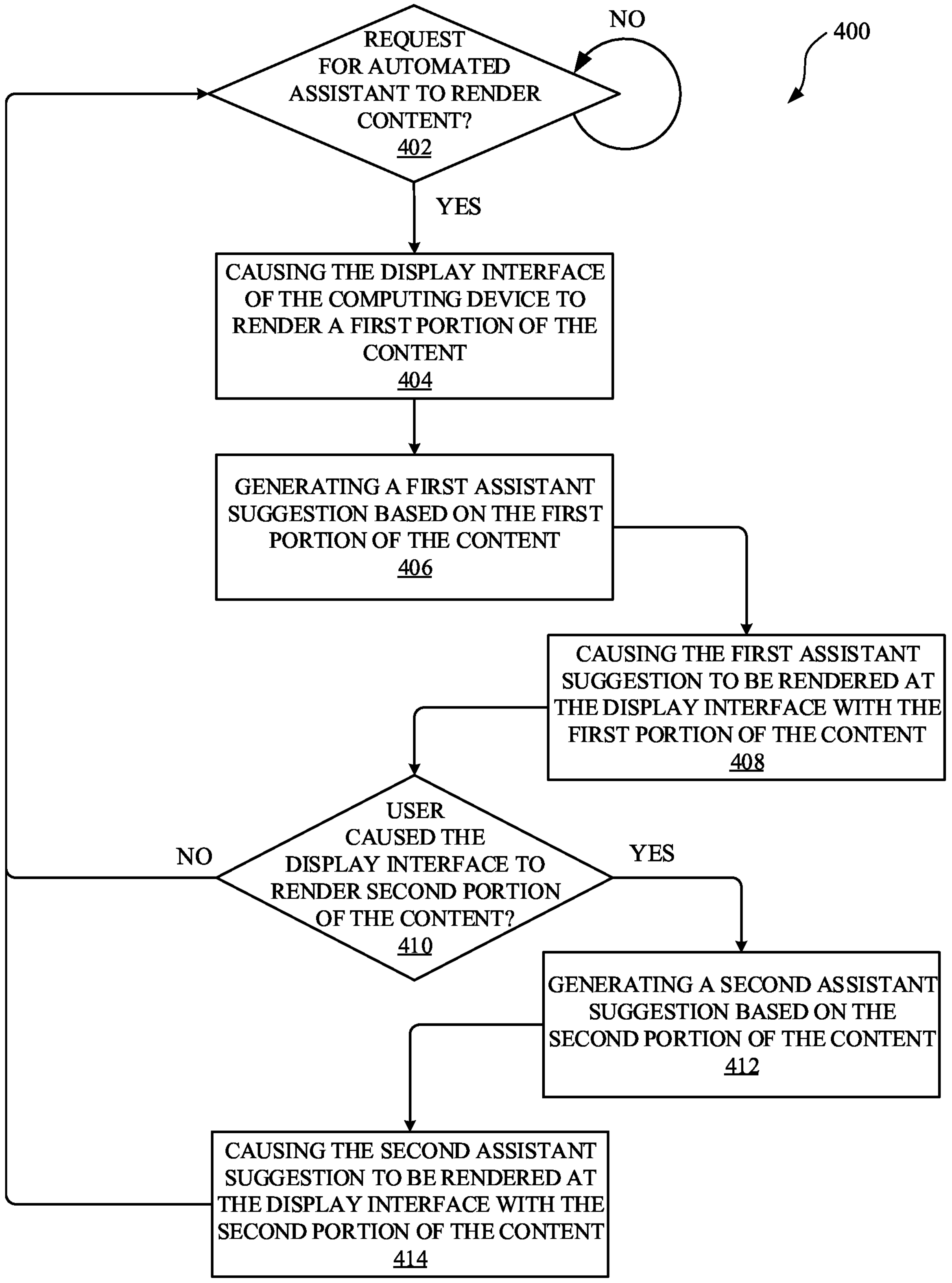
FIG. 4 illustrates a method for providing assistant suggestions that can assist a user with navigating content at a display interface of a computing device, and can be dynamically adapted as the user is further navigating through the content.

FIG. 4 illustrates a method 400 for providing assistant suggestions that can assist a user with navigating content at a display interface of a computing device, and can be dynamically adapted as the user is navigating through the content. The method 400 can be performed by one or more devices, applications, and/or any other application or module capable of interacting with an automated assistant. The method 400 can include an operation of determining whether a request has been received by the automated assistant for rendering content at a display interface of a computing device. The request can be embodied in a spoken utterance or other input that the automated assistant can be responsive to. For example, the request can be embodied in a spoken utterance such as, "Assistant, how much can a solar panel reduce my electric bill?" In response to receiving the spoken utterance, the automated assistant can determine that the user is requesting that the automated assistant render content related to solar panels.

When the request for content is determined to be provided by the user, the method 400 can proceed from the operation 402 to an operation 404, which can include causing the display interface of the computing device to render a first portion of content (e.g., a solar panel review article) for the user. In accordance with the aforementioned example, the automated assistant can, in response to receiving the spoken utterance, render content obtained from an application and/or website. The content can include text, graphics, video, and/or any other content that can be accessed by the automated assistant. Because of the finite dimensions of the display interface of the computing device, the automated assistant can cause a first portion of the content to be rendered and, optionally, preload a second portion of the content for rendering.

The method 400 can proceed from the operation 404 to an operation 406, which can include generating a first assistant suggestion based on the first portion of the content being rendered at the display interface of the computing device. For example, the first portion of the content can include details about how to reduce their electricity bill. Based on this first portion of the content, the automated assistant can generate the first assistant suggestion and identify an operation for the automated assistant to reduce an output of one or more lights in a home of the user. For example, the first assistant suggestion can include natural language content such as, "Turn off my basement lights," Alternatively, or additionally, the first assistant suggestion can correspond to an operation for the automated assistant to scroll from the first portion of the content to a second portion of the content. For example, the first assistant suggestion can include natural language content such as, "Go to 'Solar Panel Prices,'" which can be a reference to a second portion of the content that details prices for certain solar panels.

In some implementations, the first assistant suggestion can be generated by one or more interactions between the user and the automated assistant before the user provided the spoken utterance. For example, the interaction between the user and the automated assistant can involve the user requesting the automated assistant modify a setting of one or more lights of a home in the user. Alternatively, or additionally, the first assistant suggestion can be generated, with prior permission from other users, based on how the other users interacted with their respective automated assistants while viewing a solar panel review article. For instance, historical interaction data can indicate that one or more other users had quickly scrolled to solar panel prices. Based on this historical interaction data, the automated assistant can generate the first assistant suggestion to correspond to an operation for scrolling to a "Solar Panel Prices" portion of the solar panel review article.

The method 400 can proceed from the operation 406 to an operation 408, which can include causing the first assistant suggestion to be rendered at the display interface of the computing device. When the first assistant suggestion is rendered at the display interface, the method 400 can proceed to an operation 410 of determining whether the user caused the display interface to render a second portion of the content. When the automated assistant determines that the user has not caused the display interface to render the second portion of the content, the method 400 can optionally return to the operation 402. However, when the automated determines that the user has caused the display interface to render the second portion of the content, the method 400 can proceed to an operation 412.

The operation 412 can include causing the automated assistant to generate a second assistant suggestion based on the second portion of the content. The second assistant suggestion can include natural language content that summarizes another portion of the content that was accessed by the user in response to the spoken utterance received at the operation 402. For example, the automated assistant can generate the second assistant suggestion to put the user on notice that another portion of the content may include information that may be of interest to the user, thereby saving the user the time and energy of scrolling through the entire article. For instance, based on a type of smart device (e.g., a smart thermostat) that is installed in the home of the user, the automated assistant can identify another portion of the article that relates to the smart device (e.g., "Subtitle: Tips for Scheduling a Smart Thermostat"). The automated assistant can use natural language understanding and/or one or more other natural language processing techniques to provide a summary of the other portion of the article (e.g., "Use Geofencing feature of your thermostat to reduce energy.").

Alternatively, or additionally, when the second portion of the content discusses calling an entity (e.g., a power company) that may be helpful for fulfilling the request from the user, the automated assistant can generate the second assistant suggestion for controlling a communication operation of the automated assistant. For example, the second portion of the content can discuss calling a power company to discuss net metering options for solar, and based on this information, the automated assistant can identify a power company utilized by the user (e.g., based on application data and/or other contextual data). The second assistant suggestion can then include natural language content such as, "Call my utility company," and, in response to the user selecting the second assistant suggestion, the automated assistant can place a phone call to the utility company.

When the second assistant suggestion has been generated, the method 400 can proceed to an operation 414 of causing the second assistant suggestion to be rendered at the display interface of the computing device with the second portion of the content. In some implementations, the second assistant suggestion and/or the second portion of the content can be arranged according to a distance of the user from the display interface. For example, when the user is located within a threshold distance from the computing device, a content element that corresponds to the content can be displayed with other content elements that were identified in response to the request from the user. Each content element can be coupled such that, when a user provides a particular input gesture to the automated assistant (e.g., a swipe gesture), the content elements can maneuver (e.g., in a carousel-like fashion) in a direction of the gesture to reveal other content elements (e.g., other solar panel review articles). Alternatively, when the user is outside of the threshold distance, the content element can be arranged in a stacked arrangement over other content elements. When a user provides the particular input gesture to the automated assistant, the content element, corresponding to the first portion of the content, can maneuver to reveal another content element that was identified in response to the request. The method 400 can optionally return to the operation 402 for further detecting another request from the user.

Figure 5:
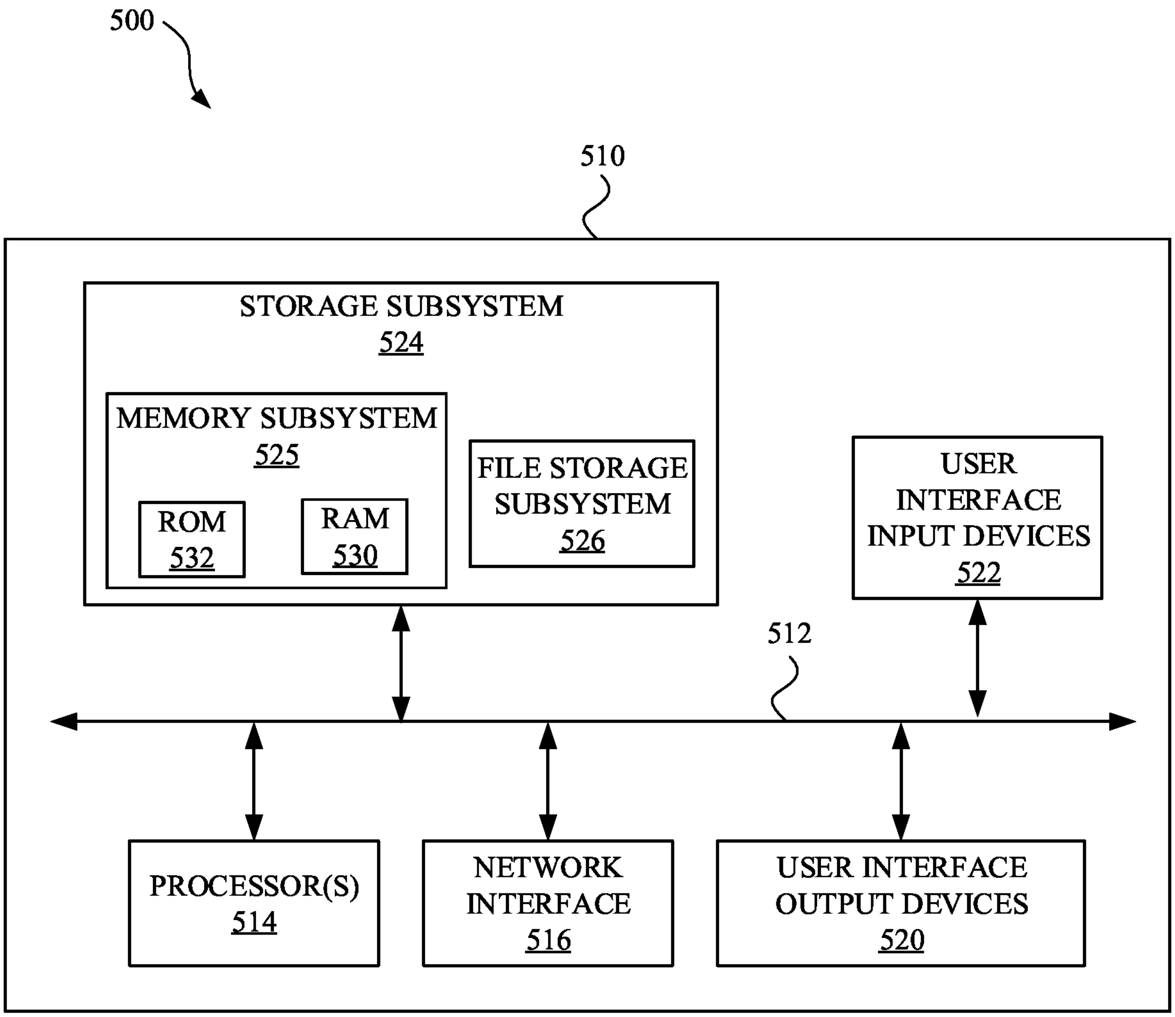
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) is provided and includes receiving, at a computing device, a request for an automated assistant to render content at a display interface of the computing device. The request is embodied in a spoken utterance that is provided by a user to the computing device. The method further includes causing, in response to receiving the request from the automated assistant, the display interface of the computing device to render a first portion of the content. The method further includes processing, by the automated assistant, content data that characterizes the first portion of the content rendered at the display interface of the computing device. The content data is processed in furtherance of generating a first assistant suggestion to be rendered at the display interface. The method further includes causing, based on processing the content data, the display interface of the computing device to render the first assistant suggestion with the first portion of the content. The method further includes, when the first portion of the content is being rendered at the display interface: determining, by the automated assistant, that the user has provided an input in furtherance of causing the display interface to render a second portion of the content, where the second portion of the content is different than the first portion of the content; processing, in response to the input, other content data that characterizes the second portion of the content, where the other content data is processed in furtherance of generating a second assistant suggestion to be rendered at the display interface; and causing, based on the other supplemental content, the display interface of the computing device to render both the second assistant suggestion and the second portion of the content, where the second assistant suggestion is different than the first assistant suggestion.

These and other implementations of the technology disclosed herein can include one or more of the following features.

In some implementations, the input from the user is directed to the first assistant suggestion and causes the second portion of the content to be rendered at the display interface of the computing device, and the first assistant suggestion includes natural language content that identifies the second portion of the content. In some of those implementations, the input is an additional spoken utterance that is provided by the user to the automated assistant.

In some implementations, the second assistant suggestion corresponds to an operation that is performed by the automated assistant at a separate computing device that is different than the computing device.

In some implementations, processing the content data includes generating the first assistant suggestion based on historical interaction data. The historical interaction data can, for example, characterize a prior interaction in which the user or another user caused the computing device or another computing device to perform an action while certain content was being rendered at the computing device or the other computing device. The certain content can include, for example, the first portion of the content.

In some implementations, first assistant suggestion is omitted from the display interface when the second assistant suggestion is being rendered at the display interface. In some of those implementations, the first portion of the content is omitted from the display interface when the second assistant suggestion is being rendered at the display interface.

In some implementations, the second assistant suggestion includes natural language content that is based on the second portion of the content, and a selection of the second assistant suggestion causes the automated assistant to initialize a separate application that is different than the automated assistant.

In some implementations, a method implemented by processor(s) is provided and includes receiving, at a computing device, a request for an automated assistant to render content at a display interface of the computing device. The request is embodied in a spoken utterance that is provided by a user to the computing device. The method further includes causing, in response to the request, the display interface to render the content. The method further includes processing, in response to the request, interaction data that characterizes a prior interaction in which the user caused the content to be rendered at the display interface of the computing device. A first assistant suggestion was rendered at the display interface with the content during the prior interaction. The method further includes generating, based on processing the interaction data, suggestion data that characterizes a second assistant suggestion that is different from the first assistant suggestion. The second assistant suggestion is generated further based on the content rendered at the display interface. The method further includes causing, based on the suggestion data, the display interface to render the second assistant suggestion with the content. The second assistant suggestion is selectable via a subsequent spoken utterance from the user to the automated assistant.

These and other implementations of the technology disclosed herein can include one or more of the following features.

In some implementations, the second assistant suggestion is rendered with particular natural language content, and the method further includes causing, when the second assistant suggestion is being rendered at the display interface, one or more speech recognition processes to be biased towards the particular natural language content of the second assistant suggestion.

In some implementations, the first assistant suggestion is rendered with particular natural language content, and the method further includes causing, when the second assistant suggestion is being rendered at the display interface, one or more speech recognition processes to be biased away from the particular natural language content.

In some implementations, the second assistant suggestion corresponds to an operation that is initialized via the automated assistant. In some of those implementations, the method further includes causing, based on the second assistant suggestion, operation data, corresponding to the operation, to be accessed by the computing device before the user provides the subsequent spoken utterance to the automated assistant.

In some implementations, receiving the request for the automated assistant to render content at the display interface of the computing device includes receiving a selection of a search result, in a list of search results, being rendered at the display interface of the computing device. In some versions of those implementations, the second assistant suggestion is generated further based on the search result in the list of search results. In some additional or alternative versions of those implementations, the second assistant suggestion is generated further based on one or more other search results in the list of search results.

In some implementations, a method implemented by processor(s) is provided and includes receiving, at a computing device, a request for an automated assistant to render content at a display interface of the computing device. The request is embodied in a spoken utterance that is provided by a user that is located a first distance from the display interface. The method further includes causing, in response to the request, the display interface of the computing device to render selectable content elements in a coupled arrangement that extends across the display interface. An input gesture receivable by the automated assistant causes multiple selectable content elements of the selectable content elements to simultaneously maneuver across the display interface. The method further includes determining, by the automated assistant, that the user has relocated from the first distance to a second distance from the display interface. The method further includes causing, based on the user relocating to the second distance from the display interface, the selectable content elements to be rendered in a stacked arrangement. At the stacked arrangement, a foreground content element of the selectable content elements is rendered over other content elements of the selectable content elements. The method further includes receiving, by the automated assistant, another request for the automated assistant to reveal a particular content element of the other content elements. The particular content element is different from the foreground content element of the selectable content elements. The method further includes causing, in response to the other request, the foreground content element of the selectable content elements to be replaced, at an area of the display interface, by the particular content element of the other content elements.

These and other implementations of the technology disclosed herein can include one or more of the following features.

In some implementations, the method further includes causing, when the selectable content elements are rendered in the coupled arrangement, one or more assistant suggestions to be rendered at the display interface with the selectable content elements. The one or more assistant suggestions are based on particular content associated with the selectable content elements. In some versions of those implementations, the method further includes causing, when the selectable content elements are rendered in the stacked arrangement, one or more other assistant suggestions to be rendered at the display interface with the selectable content elements. The one or more other assistant suggestions are based on other particular content corresponding to the foreground content elements, and the one or more assistant suggestions are different than the one or more other assistant suggestions. In some of those versions, the one or more assistant suggestions are omitted from the display interface when the one or more other assistant suggestions are being rendered at the display interface.

In some implementations, the one or more assistant suggestions identify an operation that is initialized by the automated assistant at a separate computing device that is different than the computing device.

In some implementations, wherein the one or more assistant suggestions are based on historical interaction data accessible to the automated assistant. Optionally, the historical interaction data characterizes a prior interaction in which the user or another user caused the computing device or another computing device to perform an action while particular content was being rendered at the computing device or the other computing device.

We claim:

1. A method implemented by one or more processors, the method comprising:

receiving, at a computing device, a request for an automated assistant to render content at a display interface of the computing device, wherein the request is embodied in a spoken utterance that is provided by a user that is located a first distance from the display interface;

causing, in response to the request, the display interface of the computing device to render selectable content elements in a coupled arrangement that extends across the display interface, wherein an input gesture receivable by the automated assistant causes multiple selectable content elements of the selectable content elements to simultaneously maneuver across the display interface;

determining, by the automated assistant, that the user has relocated from the first distance to a second distance from the display interface;

causing, based on the user relocating to the second distance from the display interface, the selectable content elements to be rendered in a stacked arrangement, wherein, at the stacked arrangement, a foreground content element of the selectable content elements is rendered over other content elements of the selectable content elements;

receiving, by the automated assistant, another request for the automated assistant to reveal a particular content element of the other content elements, wherein the particular content element is different from the foreground content element of the selectable content elements;

causing, in response to the other request, the foreground content element of the selectable content elements to be replaced, at an area of the display interface, by the particular content element of the other content elements.

2. The method of claim 1, further comprising:

causing, when the selectable content elements are rendered in the coupled arrangement, one or more assistant suggestions to be rendered at the display interface with the selectable content elements, wherein the one or more assistant suggestions are based on particular content associated with the selectable content elements.

3. The method of claim 2, further comprising:

causing, when the selectable content elements are rendered in the stacked arrangement, one or more other assistant suggestions to be rendered at the display interface with the selectable content elements, wherein the one or more other assistant suggestions are based on other particular content corresponding to the foreground content elements, and wherein the one or more assistant suggestions are different than the one or more other assistant suggestions.

4. The method of claim 3, wherein the one or more assistant suggestions are omitted from the display interface when the one or more other assistant suggestions are being rendered at the display interface.

5. The method of claim 2, wherein the one or more assistant suggestions identify an operation that is initialized by the automated assistant at a separate computing device that is different than the computing device.

6. The method of claim 2, wherein the one or more assistant suggestions are based on historical interaction data accessible to the automated assistant, and wherein the historical interaction data characterizes a prior interaction in which the user or another user caused the computing device or another computing device to perform an action while particular content was being rendered at the computing device or the other computing device.

7. The method of claim 1, wherein the input gesture, receivable by the automated assistant while the selectable content elements are rendered in the coupled arrangement, causes the multiple selectable content elements of the selectable content elements to simultaneously maneuver across the display interface in a carousel arrangement and reveal additional selectable content elements of the selectable content elements.

8. A client device comprising:

a display interface;

an audio interface;

memory storing instructions;

one or more processors operable to execute the instructions to:

receive, at a computing device, a request for an automated assistant to render content at a display interface of the computing device, wherein the request is embodied in a spoken utterance that is provided by a user that is located a first distance from the display interface;

cause, in response to the request, the display interface of the computing device to render selectable content elements in a coupled arrangement that extends across the display interface, wherein an input gesture receivable by the automated assistant causes multiple selectable content elements of the selectable content elements to simultaneously maneuver across the display interface;

determine, by the automated assistant, that the user has relocated from the first distance to a second distance from the display interface;

cause, based on the user relocating to the second distance from the display interface, the selectable content elements to be rendered in a stacked arrangement, wherein, at the stacked arrangement, a foreground content element of the selectable content elements is rendered over other content elements of the selectable content elements;

receive, by the automated assistant, another request for the automated assistant to reveal a particular content element of the other content elements, wherein the particular content element is different from the foreground content element of the selectable content elements;

cause, in response to the other request, the foreground content element of the selectable content elements to be replaced, at an area of the display interface, by the particular content element of the other content elements.

9. The client device of claim 8, wherein the instructions further comprise:

cause, when the selectable content elements are rendered in the coupled arrangement, one or more assistant suggestions to be rendered at the display interface with the selectable content elements, wherein the one or more assistant suggestions are based on particular content associated with the selectable content elements.

10. The client device of claim 9, wherein the instructions further comprise:

cause, when the selectable content elements are rendered in the stacked arrangement, one or more other assistant suggestions to be rendered at the display interface with the selectable content elements, wherein the one or more other assistant suggestions are based on other particular content corresponding to the foreground content elements, and wherein the one or more assistant suggestions are different than the one or more other assistant suggestions.

11. The client device of claim 10, wherein the one or more assistant suggestions are omitted from the display interface when the one or more other assistant suggestions are being rendered at the display interface.

12. The client device of claim 9, wherein the one or more assistant suggestions identify an operation that is initialized by the automated assistant at a separate computing device that is different than the computing device.

13. The client device of claim 9, wherein the one or more assistant suggestions are based on historical interaction data accessible to the automated assistant, and wherein the historical interaction data characterizes a prior interaction in which the user or another user caused the computing device or another computing device to perform an action while particular content was being rendered at the computing device or the other computing device.

14. The client device of claim 8, wherein the input gesture, receivable by the automated assistant while the selectable content elements are rendered in the coupled arrangement, causes the multiple selectable content elements of the selectable content elements to simultaneously maneuver across the display interface in a carousel arrangement and reveal additional selectable content elements of the selectable content elements.

15. A system comprising:

one or more storage devices storing instructions; and one or more processors that are operable to execute the instruction to cause the one or more processors to:

receive, at a computing device, a request for an automated assistant to render content at a display interface of the computing device, wherein the request is embodied in a spoken utterance that is provided by a user that is located a first distance from the display interface;

cause, in response to the request, the display interface of the computing device to render selectable content elements in a coupled arrangement that extends across the display interface, wherein an input gesture receivable by the automated assistant causes multiple selectable content elements of the selectable content elements to simultaneously maneuver across the display interface;

determine, by the automated assistant, that the user has relocated from the first distance to a second distance from the display interface;

cause, based on the user relocating to the second distance from the display interface, the selectable content elements to be rendered in a stacked arrangement, wherein, at the stacked arrangement, a foreground content element of the selectable content elements is rendered over other content elements of the selectable content elements;

receive, by the automated assistant, another request for the automated assistant to reveal a particular content element of the other content elements, wherein the particular content element is different from the foreground content element of the selectable content elements;

cause, in response to the other request, the foreground content element of the selectable content elements to be replaced, at an area of the display interface, by the particular content element of the other content elements.

16. The system of claim 15, wherein the one or more processors are further to:

cause, when the selectable content elements are rendered in the coupled arrangement, one or more assistant suggestions to be rendered at the display interface with the selectable content elements, wherein the one or more assistant suggestions are based on particular content associated with the selectable content elements.

17. The system of claim 16, wherein the one or more processors are further to:

cause, when the selectable content elements are rendered in the stacked arrangement, one or more other assistant suggestions to be rendered at the display interface with the selectable content elements, wherein the one or more other assistant suggestions are based on other particular content corresponding to the foreground content elements, and wherein the one or more assistant suggestions are different than the one or more other assistant suggestions.

18. The system of claim 17, wherein the one or more assistant suggestions are omitted from the display interface when the one or more other assistant suggestions are being rendered at the display interface.

19. The system of claim 16, wherein the one or more assistant suggestions identify an operation that is initialized by the automated assistant at a separate computing device that is different than the computing device.

20. The system of claim 16, wherein the one or more assistant suggestions are based on historical interaction data accessible to the automated assistant, and wherein the historical interaction data characterizes a prior interaction in which the user or another user caused the computing device or another computing device to perform an action while particular content was being rendered at the computing device or the other computing device.

* * * * *